(12) United States Patent  (10) Patent No.:     US 8,305,853 B2
Ueno et al.                (45) Date of Patent:     Nov. 6, 2012

(54) OPTICAL DISC DRIVE DEVICE

(75) Inventors: Hiroyasu Ueno, Osaka (JP); Yasuhisa Fujiwara, Osaka (JP); Hiroyasu Iwatsuki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 193 days.

(21) Appl. No.: 12/864,081

(22) PCT Filed: Mar. 10, 2009

(86) PCT No.: PCT/JP2009/054581
§ 371 (c)(1),
(2), (4) Date: Jul. 22, 2010

(87) PCT Pub. No.: WO2009/113553
PCT Pub. Date: Sep. 17, 2009

(65) Prior Publication Data
US 2010/0329092 A1    Dec. 30, 2010

(30) Foreign Application Priority Data
Mar. 11, 2008 (JP) ................................ 2008-061612

(51) Int. Cl.
*G11B 20/20* (2006.01)
*G06F 12/00* (2006.01)
(52) U.S. Cl. .................................... 369/47.34; 711/103
(58) Field of Classification Search ............... 369/30.35, 369/47.34, 47.32, 47.28, 47.15, 47.14; 360/8, 360/69; 711/113, 129, 159, 114, 103, 118, 711/119
See application file for complete search history.

(56) References Cited

U.S. PATENT DOCUMENTS

| | | | |
|---|---|---|---|
| 5,933,853 A | 8/1999 | Takagi | |
| 6,131,147 A | 10/2000 | Takagi | |
| 7,472,219 B2 * | 12/2008 | Tamura et al. | 711/103 |
| 2004/0139249 A1 | 7/2004 | Chung et al. | |
| 2004/0139394 A1 | 7/2004 | Chung et al. | |
| 2004/0139395 A1 | 7/2004 | Chung et al. | |
| 2004/0141716 A1 | 7/2004 | Chung et al. | |
| 2004/0143853 A1 | 7/2004 | Chung et al. | |
| 2004/0148627 A1 | 7/2004 | Chung et al. | |
| 2005/0071551 A1 | 3/2005 | Miyamoto | |
| 2007/0019315 A1 | 1/2007 | Tamura et al. | |

FOREIGN PATENT DOCUMENTS

| | | |
|---|---|---|
| JP | 6-314177 A | 11/1994 |
| JP | 6-338139 A | 12/1994 |
| JP | 8-77073 A | 3/1996 |
| JP | 2007-34536 A | 2/2007 |
| JP | 2007-52914 A | 3/2007 |
| RU | 2 298 845 C2 | 5/2007 |

OTHER PUBLICATIONS

Search Report for corresponding European patent application No. 09720630.4 dated Aug. 6, 2012.

* cited by examiner

*Primary Examiner* — Ali Neyzari
(74) *Attorney, Agent, or Firm* — Birch, Stewart, Kolasch & Birch, LLP

(57) ABSTRACT

A hybrid BD drive 1 (1) of the present invention includes a flash control section (2) which (a) uses a flash memory (7) as a cache memory in a case where the hybrid BD drive (1) receives an address or data via an interface (13) and which (b) uses the flash memory (7) as a data memory in a case where the hybrid BD drive (1) receives an address or data via an interface (14). This makes it possible to provide an optical disc drive device having a nonvolatile memory capable of reducing an access time in random access and storing data except cache data.

8 Claims, 11 Drawing Sheets

OPTICAL DISC DRIVE DEVICE

TECHNICAL FIELD

The present invention relates to an optical disc drive device having at least a function of reading out data stored on an optical disc.

BACKGROUND ART

Disc storage media such as CDs (Compact Discs), DVDs (Digital Versatile Discs), and BDs (Blu-ray Discs) allow random access in which direct access to a position of intended data is allowed.

However, an access time required for random access varies depending on devices. In particular, an optical disc drive device for reading and writing information from/onto an optical disc is slower in access speed than magnetic disk devices such as hard disk drives.

Recent years, an operating system (OS) environment of a computer is often shared between different computers. That is, different computers often operate in a same OS environment. In such a case, a user has to take out a medium storing OS data from a device so as to carry the medium from one computer to another. Therefore, the user runs the OS by use of an optical disc drive device from which the medium can be taken out. However, as described above, optical disc drive devices have a shortcoming in that access speeds are slower than hard disk drives.

An access time is determined by a seek time which is a time until a head is moved to a predetermined position on a disc or by a rotational latency of the disc which is a time until a predetermined sector is read by the head. Therefore, in order to reduce the access time, it is necessary to reduce the seek time by improving an actuator or to reduce the rotational latency by increasing the number of rotations of the disc. However, such improvement of an optical disc drive device is nearly reaching limitation of reduction of an access time. Therefore, different measures are sought after for further reduction of an access time.

Patent Literature 1 discloses a magnetic disk device which has a nonvolatile memory so as to allow reduction in access time. Specifically, in the magnetic disk device disclosed in Patent Literature 1, logical addresses are assigned to the nonvolatile memory so that the nonvolatile memory can be handled as logical sectors on a magnetic disk. Thus, the magnetic disk device handles the magnetic disk and the nonvolatile memory as one virtual storage medium. This allows a higher access speed in the case of reading and/or writing of data stored in the nonvolatile memory, as compared to reading and/or writing of data from/onto the magnetic disk.

Citation List

Patent Literature 1

Japanese Patent Application Publication, Tokukaihei, No. 06-314177 A (Publication Date: Nov. 8, 1994)

SUMMARY OF INVENTION

Since the magnetic disk device disclosed in Patent Literature 1 handles the magnetic disk and the nonvolatile memory as one virtual storage medium, an access speed cannot be increased for reading and/or writing of data from/onto the magnetic disk. For an increase in speed of accessing data stored on the magnetic disk, it is necessary to provide a cache memory for storing, as so-called cache data, the data stored on the magnetic disk.

However, the cache memory cannot store data except cache data. This leads to a problem in that an unused capacity of the cache memory is wasted in a case where an amount of the data stored on the magnetic disc is smaller than a memory capacity of the cache memory.

The present invention was made in view of the problem. A main object of the present invention is to provide an optical disc drive device having a nonvolatile memory capable of reducing an access time in random access and storing data except cache data.

In order to attain the object, an optical disc drive device of the present invention is an optical disc drive device including a nonvolatile memory includes: cache control means, wherein if a first address specifying a sector of an optical disc is received via a first interface, the cache control means reads out, from the nonvolatile memory, cache data having been read out from the sector and stored in the nonvolatile memory in correlation with the first address, and if the cache data cannot be thus read out from the nonvolatile memory, the cache control means receives data stored in the sector on the optical disc and writes the data in the nonvolatile memory in correlation with the first address; and data control means for (a) reading out data from the nonvolatile memory in accordance with a second address received via a second interface, or (b) writing, in the nonvolatile memory, data received via the second interface.

In the optical disc drive device of the present invention, the nonvolatile memory can be used as (i) a so-called cache memory for storing cache data in accordance with an interface via which an address is received and as (ii) a data memory for storing data except the cache data.

That is, in a case where the nonvolatile memory is used as a cache memory, data identical with data stored on an optical disc can be read out from cache data stored in the nonvolatile memory which requires a shorter time in data readout than an optical disc drive device. This makes it possible to reduce a time required for reading out data from an optical disc. The nonvolatile memory can be used not only as a cache memory but also as a data memory. This makes it possible to store, in a memory area where no cache data is stored, data except cache data.

This allows the optical disc drive device of the present invention to reduce an access time in random access, and to effectively utilize an unused memory area of the nonvolatile memory.

Since the nonvolatile memory which serves as a data memory is provided in the optical disc drive device, the optical disc drive device can transfer data stored on an optical disc to the nonvolatile memory, without using a bus between the optical disc drive device and a host. This makes it possible to eliminate the need for those encryption and decryption of data which are required in outputting the data via an external bus. As a result, the optical disc drive device can transfer data stored on an optical disc to the nonvolatile memory at a high speed, without applying a load to the host connected with the optical disc drive device.

Further, the optical disc drive device of the present invention is preferably arranged such that the data control means deletes the cache data so as to secure an area in which the data received via the second interface is to be written.

According to the arrangement, in the nonvolatile memory, storage of the data except the cache data is given a higher priority than retention of the cache data. That is, in the nonvolatile memory, a memory area to be used as a cache memory is properly resized in accordance with a size of a memory area to be used as a data memory.

As a result, the optical disc drive device can divide a memory area of the nonvolatile memory into (i) the area to be used as a cache memory capable of storing cache memory and (ii) an area to be used as a data memory capable of storing data except the cache data, without wasting the memory area of the nonvolatile memory.

Further, the optical disc drive device of the present invention further preferably includes disc detecting means for detecting loading of an optical disc, and is preferably arranged such that when the disc detecting means detects loading of an optical disc, the cache control means receives, data stored in a sector on the optical disc, the sector being specified by an address, and writes the data in the nonvolatile memory in such a manner that the data is correlated with the address.

According to the arrangement, when loading an optical disc in the optical disc drive device, the optical disc drive device can automatically store, in the nonvolatile memory as cache data, the data stored on the optical disc thus loaded. As a result, the optical disc drive device can store, in the nonvolatile memory as cache data, the data stored on the optical disc, without requiring a troublesome user operation.

Further, the optical disc drive device of the present invention is preferably arranged such that the cache control means overwrites, with data received together with the first address via the first interface, the cache data to be read out from the nonvolatile memory in accordance with the first address.

According to the arrangement, the cache data stored in the nonvolatile memory is overwritten with data to be stored on an optical disc. This allows the nonvolatile memory to always store updated cache data.

The optical disc drive device of the present invention is preferably arranged such that the cache control means writes back, into the sector specified by the first address, the cache data thus overwritten.

According to the arrangement, the cache data thus overwritten is written back into a predetermined sector on the optical disc. That is, data overwritten in the nonvolatile memory is written onto an optical disc.

This allows an optical disc to store updated data even if cache data is deleted from the nonvolatile memory.

Further, the optical disc drive device of the present invention further preferably includes identification information obtaining means for obtaining identification information, the identification information stored on an optical disc in order that the optical disc may be distinguished from another optical disc, and is preferably arranged such that the cache control means initializes the cache data in a case where identification information obtained by the identification information obtaining means does not match identification information of an optical disc storing data identical with data stored, as cache data, in the nonvolatile memory.

According to the arrangement, the cache control means determines, on the basis of the identification information, whether or not a currently-loaded optical disc is identical with a previously-loaded optical disc, and only if not, initializes the cache data stored in the nonvolatile memory.

Therefore, in a case where identical optical discs are sequentially loaded in the optical disc drive device, cache data is retained as it is. This makes it possible to omit a process of storing, as cache data, data stored on an optical disc. For example, in a case where data stored on the optical discs is data of an OS, it is possible to reduce a time required for a start-up of the OS.

Further, the optical disc drive device of the present invention preferably further includes: identification information generating means for generating identification information for identifying an optical disc to be distinguishable from another optical disc; and data writing means for writing, onto the optical disc, the identification information generated by the identification information generating means.

According to the arrangement, the identification information generated in the optical disc drive device can be assigned to the optical disc. This makes it possible to assign the identification information to even an optical disc which originally has no identification information.

The present invention encompasses (i) a program for causing the optical disc drive device of the present invention to operate, the program for driving a computer as respective means, and (ii) a computer-readable storage medium storing the program.

For a fuller understanding of the nature and advantages of the invention, reference should be made to the ensuing detailed description taken in conjunction with the accompanying drawings.

REFERENCE SIGNS LIST

Figure 1:
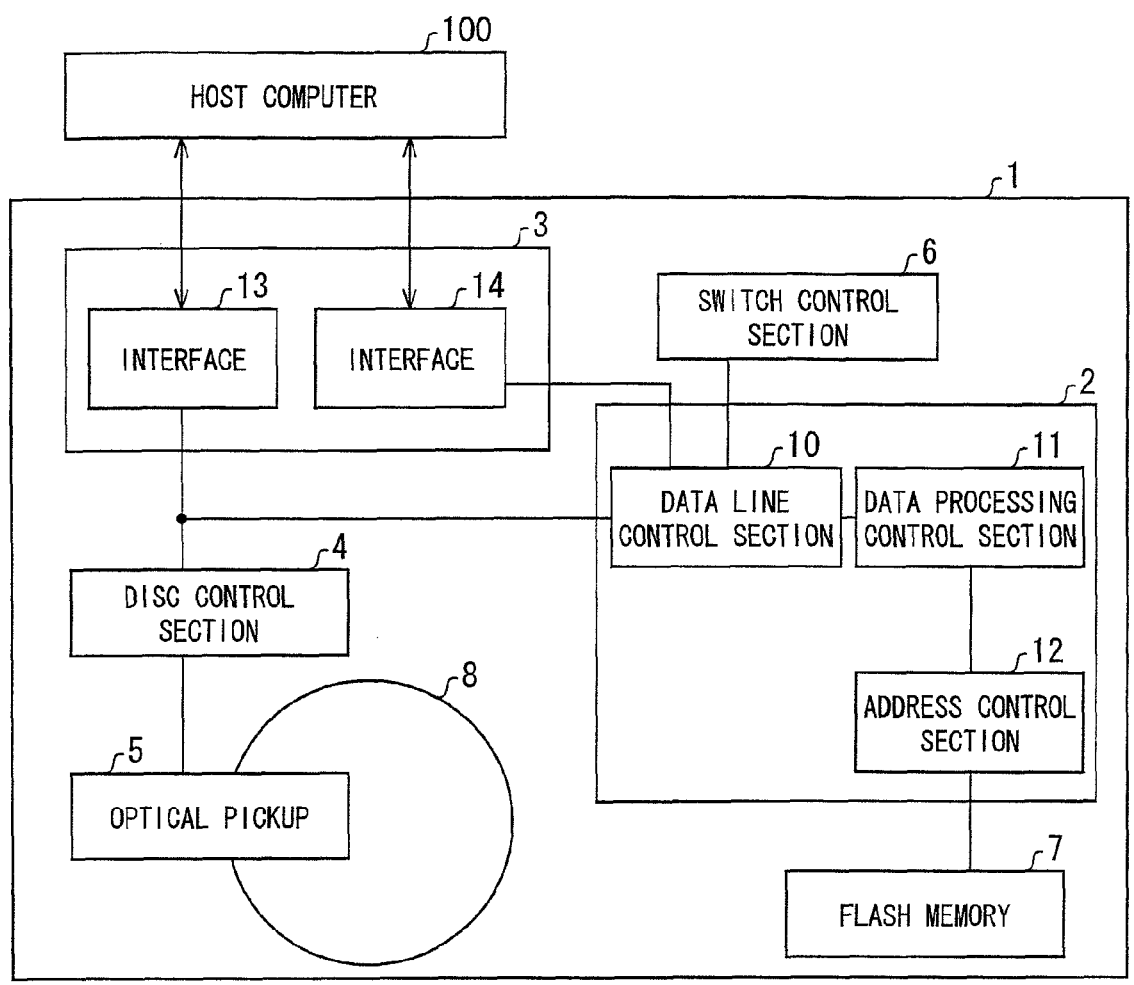
FIG. 1 is a block diagram illustrating an arrangement of a main part of a hybrid BD drive of the present invention.

1 Hybrid BD drive (optical disc drive device)
2 Flash control section
3 Interface control section
4 Disc control section (disc detecting means and data writing means)
5 Optical pickup
6 Switch control section
7 Flash memory (nonvolatile memory)
8 Blu-ray disc (optical disc)
10 Data line control section
11 Data processing section (cache control means and data control means)

12 Address control section
13 Interface (first interface)
14 Interface (second interface)
100 Host computer Description of Embodiments

[First Embodiment]

(Arrangement of Hybrid BD Drive 1)

The following describes one embodiment of an optical disc drive device of the present invention, with reference to FIGS. 1 through 10. FIG. 1 is a block diagram illustrating an arrangement of a main part of a hybrid BD drive (optical disc drive device) 1.

As illustrated in FIG. 1, the hybrid BD drive 1 includes a flash control section 2, an interface control section 3, a disc control section (optical disc detecting means and data writing means) 4, an optical pickup 5, a switch control section 6, a flash memory (nonvolatile memory) 7, and a Blu-ray disc (BD; an optical disc) 8. The hybrid BD drive 1 is connected with a host computer 1 via the interface control section 3. Although, strictly, the BD 8 and the host computer 100 are not members constituting the hybrid BD drive 1, FIG. 1 illustrates the BD 8 and the host computer 100, for convenience of understanding of the present invention.

The "hybrid BD drive" in the present Description etc. refers to a BD drive having a flash memory. That is, the "hybrid BD drive" refers to a device in which an optical disc drive device and a memory medium are combined.

Although the present embodiment describes, as an example, an optical disc drive device to which a BD is loaded as an optical disc, needless to say, the optical disc is not limited to a BD. The optical disc drive device of the present invention can be an optical disc drive device which stores an optical disc except BDs, such as a CD and a DVD. In the present Description etc., "loading" (mounting) an optical disc refers to setting the optical disc inside the optical disc drive device so that reading or writing from/onto the optical disc is allowed. The following describes respective functions of the members of the hybrid BD drive 1.

(Interface Control Section 3)

The interface control section 3 controls interfaces of the hybrid BD drive 1 which are connected with interfaces of the host computer 10. As illustrated in FIG. 1, the interface control section 3 includes an interface (first interface) 13 and an interface (second interface) 14.

As illustrated in FIG. 1, a data line (bus) extending from the interface 13 is connected with the flash control section 2 and with the disc control section 4. In addition, a data line (bus) extending from the interface 14 is connected with the flash control section 2. That is, data received via the interface 13 is transmitted to the flash control section 2 or to the disc control section 4 while data received via the interface 14 is transmitted to the flash control section 2.

Examples of the interfaces 13 and 14 encompass SATA (Serial AT attachment), USB (Universal Serial Bus), IEEE1394, and SCSI (Small Computer System Interface). Of these interfaces, the interfaces 13 and 14 are preferably SATA or USB, from viewpoints of general versatility and data transmission speed. ATA (AT attachment) is not limited to SATA which is ATA whose transfer method is serial transfer. Alternatively, PATA can be used whose transfer method is parallel transfer. The interfaces 13 and 14 can be those which are different in type from each other, or can be those of a same type.

(Flash Control Section 2)

In accordance with data (e.g., address) received via the interfaces 13 or 14, the flash control section 2 writes data in the flash memory 7 or reads out data from the flash memory 7. In addition, the flash control section 2 writes data stored in the flash memory 7 onto the BD 8. In short, the flash control section 2 can properly change how to operate, in accordance with via which one of the interfaces 13 and 14 the data is received. As illustrated in FIG. 1, the flash control section 2 includes a data line control section 10, a data processing control section (cache control means and data control means) 11, and an address control section 12.

The data line control section 10 controls a flow of data received via the interface 13 or 14. Specifically, the data line control section 10 determines whether received data is data received via the interface 13 (i.e., first address) or data received via the interface 14 (i.e., second address), and outputs determination to the data processing control section 11. In addition, as instructed by a switch control section 6 to be described later, the data line control section 10 recognizes the data lines (buses) connected respectively with the interfaces 13 and 14.

The data processing control section 11 controls data readout from the flash memory 7 or data writing into the flash memory 7. Specifically, the data processing control section 11 carries out a writing process and a reading process, in accordance with which one of the data lines is detected by the data line control section 10, i.e., in accordance with via which one of the interfaces data is transmitted. The data processing control section 11 also controls how data in the flash memory 7 is written onto the BD 8. More detailed processing of the data processing control section 11 is described later.

The address control section 12 carries out process (reading or writing) as instructed by the data processing control section 11. Specifically, the address control section 12 reads out, from the data processing control section 11, data stored at an address of the flash memory 7 or writes, in the flash memory 7, data specified by the data processing control section 11.

(Disc Control Section 4)

The disc control section 4 controls processes, which are carried out with respect to the BD 8, such as control of data readout from the BD 8, control of data writing onto the BD 8, and detection of loading of the BD. Specifically, the disc control section 4 controls data writing onto the BD 8, in accordance with data received via the interface 13 and in accordance with data received via the flash control section 2. In addition, the disc control section 4 outputs data read out from the BD 8, to the host computer 100 via the interface 13 and to the flash control section 2.

(Optical Pickup 5)

The optical pickup 5 is driven as instructed by the disc control section 4. The optical pickup 5 includes a light source and a light-receiving section which are for reading out data stored on the BD 8 and writing data onto the BD 8.

(Switch Control Section 6)

The switch control section 6 controls a switch for selecting either one or both of the data lines one of which connects the host computer 100 with the flash control section 2 via the interface 13 and the other one of which connects the host computer 100 with the flash control section 2 via the interface 14. The switch controlled by the switch control section 6 is used for specifying (i) either one of the data lines or (ii) both the data lines, as (a) data line(s) to be brought into operation. As instructed by the switch control section 6, the data line control section 10 establishes (a) data line(s) between the data line control section 10 and the interface(s) 13 and/or 14 in the interface control section 3.

The switch controlled by the switch control section 6 can be a hardware switch or a software switch.

(Flash Memory 7)

The flash memory 7 is a nonvolatile memory in which memory content is not erased by power-off. The flash memory 7 serves as a cache memory which temporarily stores, as cache data, data stored on the BD 8. In addition, the flash memory 7 serves as a data memory which stores data except the cache data. That is, the flash memory 7 can save, in an area where no cache data is stored, data except the cache data. The host PC 100 can be arranged such that the data memory is recognized as a hard disk drive or as another memory device.

Figure 2:
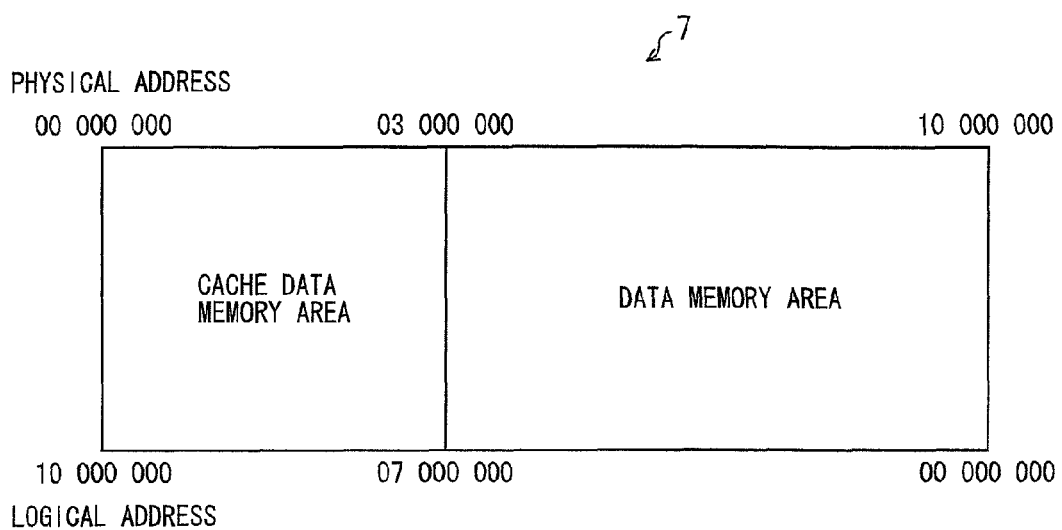
FIG. 2 is a schematic diagram illustrating a memory area of a flash memory.

FIG. 2 is a schematic diagram schematically illustrating a memory area of the flash memory 7. As illustrated in FIG. 2, the flash memory 7 includes (i) a cache data memory area for storing cache data and (ii) a data memory area for storing data except the cache data. In other words, the cache data memory area is a memory area to be used in a case where the flash memory 7 serves as a cache memory whereas the data memory area is a memory area to be used in a case where the flash memory 7 serves as a data memory.

As illustrated in FIG. 2, addresses of 00 000 000 through 10 000 000 (unit: K) are assigned to the flash memory 7 as physical addresses. In addition, addresses of 10 000 000 through 00 000 000 (unit: K) are assigned to the flash memory 7 as logical addresses (virtual addresses) so that the physical addresses and the logical addresses correspond one-to-one to each other. The present embodiment deals with, as an example, a case where pieces of the cache data are sequentially stored at physical addresses starting from 00 000 000 in ascending order of the physical addresses whereas pieces of the data except the cache data are sequentially stored at physical addresses starting from 10 000 000 (corresponding to the logical address of 00 000 000) in descending order of the physical addresses. However, the present embodiment is not limited to this but can be properly arranged depending on how physical addresses are dealt with.

FIG. 2 illustrates a case where an area specified by the physical addresses 00 000 000 through 03 000 000 is used as the cache data memory area while an area specified by the physical addresses 03 000 000 through 10 000 000 is used as the data memory area. However, the present embodiment is not limited to this. It is possible to properly set in what proportions the flash memory 7 is divided into the cache data memory area and the data memory area. How the flash memory 7 is divided into the cache data memory area and the data memory area is described later in detail. An area where no cache data nor data except the cache data is stored is a free area.

The flash memory 7 can be a NAND-type flash memory or a NOR-type flash memory.

In the present Description etc., "cache data" refers to that data stored in the flash memory 7 which is identical with data stored on the BD 8. In the present Description etc., "cache memory" refers to a memory (memory medium) having a function of (i) temporarily storing data stored on the BD 8 and (ii) reading out, in a case where data readout to the BD 8 is carried out, the data not from the BD 8 but from the flash memory 7.

(Operation of Hybrid BD Drive 1)

Figure 3:
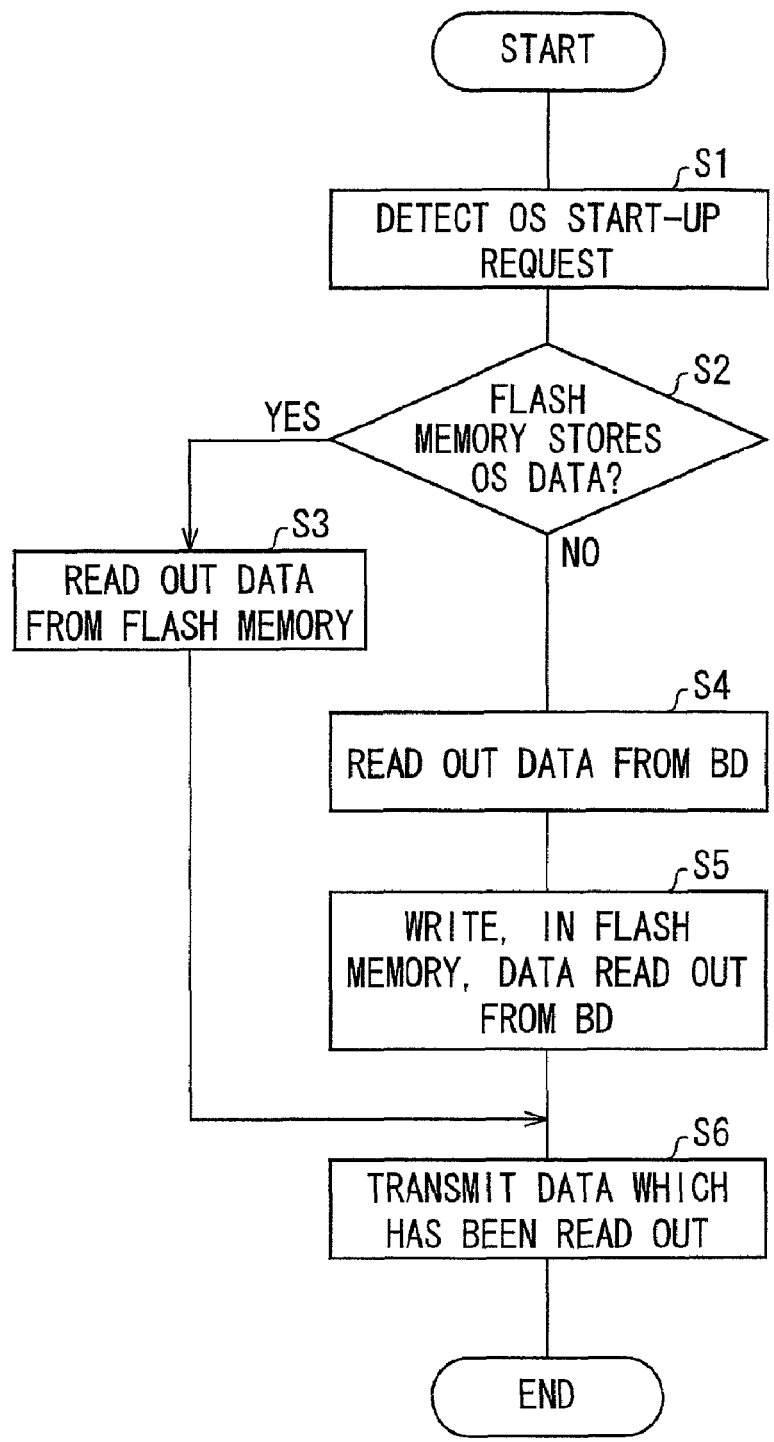
FIG. 3 is a flowchart showing a system start-up operation of the hybrid BD drive.
Figure 4:
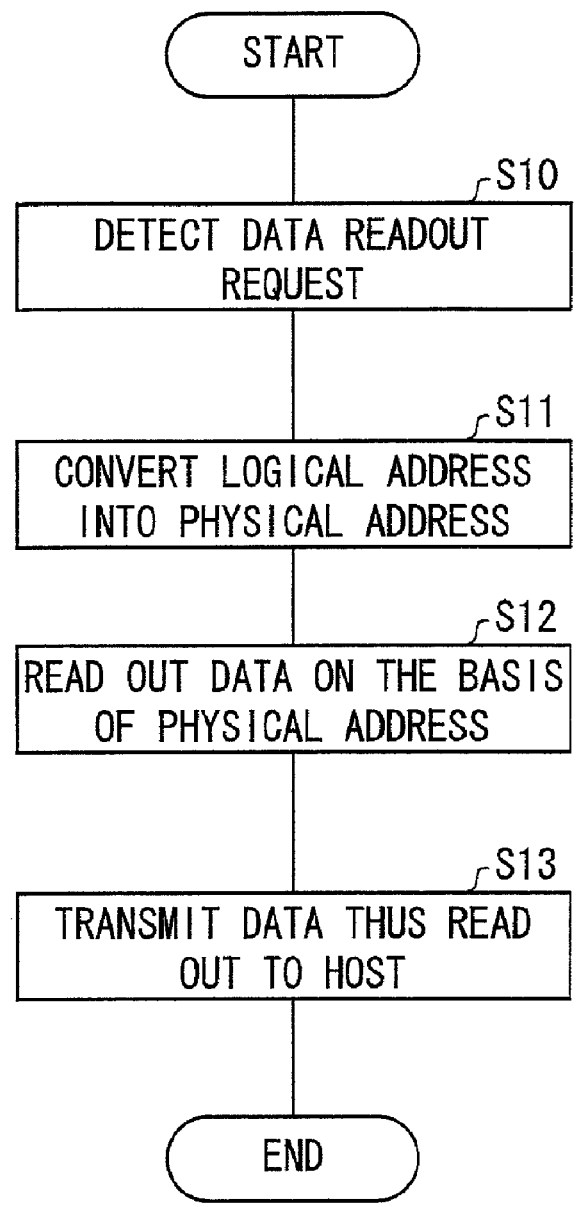
FIG. 4 is a flowchart showing a data processing operation of the hybrid BD drive.
Figure 5:
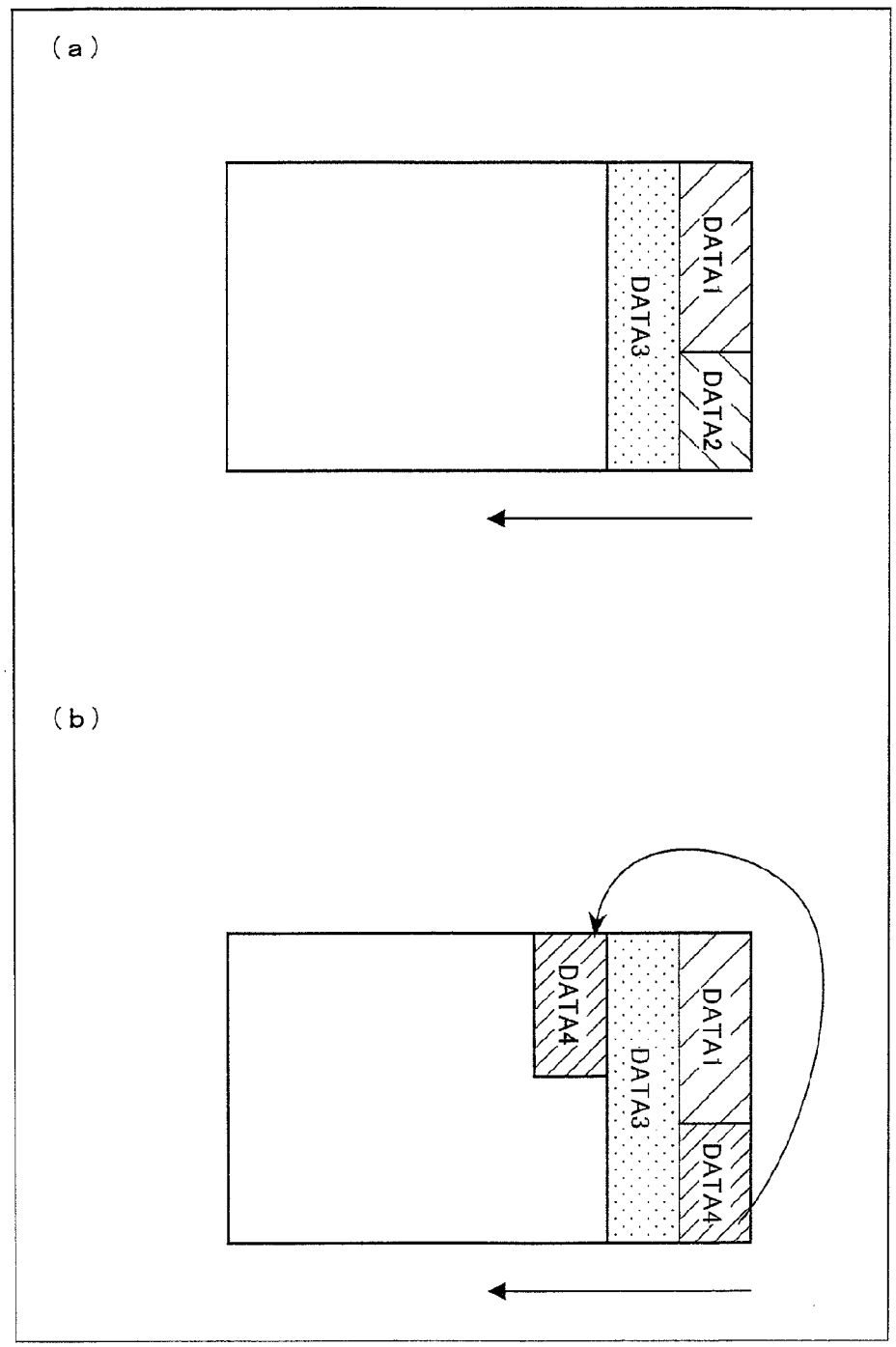
FIG. 5 is a schematic diagram illustrating a data memory area of the flash memory. (a) of FIG. 5 illustrates the data memory area in which data 4 has not been written yet. (b) of FIG. 5 illustrates the data memory area in which data 2 has been deleted and data 4 has been written.

The following describes how the hybrid BD drive operates, with reference to FIGS. 3 and 4. Operation of the hybrid BD drive 1 can be broadly divided into the following two operations: a system starting operation and a data processing operation. Each of the two operations is described below.

(System Starting Operation)

First, the following describes the system starting operation of the hybrid BD drive 1, with reference to FIG. 3. In the present Description etc., "system starting operation" refers to an operation of the hybrid BD drive 1 which is performed in a case where the flash memory 7 is used as a cache memory. FIG. 3 is a flowchart showing the system starting operation of the hybrid BD drive 1.

An example below of the system starting operation to be described in the present embodiment deals with a case where an OS is started from the hybrid BD drive 1.

First, the host computer 100 requests the hybrid BD drive 1 to start the OS (step S1). Specifically, the host computer 100 requests the hybrid BD drive 1 to read out, from the BD 8, data necessary for starting the OS. In this process, a request (an address on the BD 8) received from the host computer 100 is inputted to the flash control section 2 via the interface 13. Then, the flash control section 2 determines whether or not the data requested by the host computer 100 is stored in the flash memory 7 (step S2).

If the data requested by the host computer 100 is stored in the flash memory 7 (Yes in step S2), the flash control section 2 reads out the data from the flash memory 7 (step S3). The data thus read out is outputted to the host computer 100 via the interface 13 (step S6).

If the data requested by the host computer 100 is not stored in the flash memory 7 (No in step S2), the disc control section 4 drives the optical pickup 5 in order to read out the data from the BD 8 (step S4). The data thus read out is outputted to the host computer 100 via the interface 13 (step S6). The data thus read out is also transmitted to the flash control section 2. Then, the flash control section 2 writes the data thus read out in the flash memory 7 (step S5). An order in which the steps S5 and S6 are carried out is not limited to this but can be reversed.

(Data Processing Operation)

The following describes the data processing operation of the hybrid BD drive 1, with reference to FIG. 4. In the present Description etc., "data processing operation" refers to an operation of the hybrid BD drive 1 which is performed in a case where the flash memory 7 is used as a data memory for storing data except cache data. FIG. 4 is a flowchart showing the data processing operation of the hybrid BD drive 1.

An example below of the data processing operation to be described in the present embodiment deals with a case where the host computer 100 reads out data from the flash memory 7.

First, the host computer 100 requests the hybrid BD drive 1 to read out data from the flash memory 7 (step S10). Specifically, the host computer 100 outputs, to the hybrid BD drive 1, a logical address of the flash memory 7 at which logical address the data thus requested is stored. In this process, the logical address of the flash memory 7 received by the hybrid BD drive 1 from the host computer 100 is transmitted to the flash control section 2 via the interface 14.

The flash control section 2 converts the logical address of the flash memory 7 received from the host computer 100 into a physical address of the flash memory 7 (step S11). In accordance with the physical address thus converted, the flash control section 2 reads out the data from the flash memory 7 (step S12). Specifically, the flash control section 2 reads out the data stored in an area specified by the physical address thus converted. The data thus read out is outputted to the host computer 100 via the interface 14 (step S13).

Although the above deals with, as an example, a case where data is read out from the flash memory 7, the hybrid BD drive 1 broadly operates in the same manner even if data is written in the flash memory 7. For example, in a case where data is written in the flash memory 7, the flash control section 2 writes, in ascending order of logical addresses in an area of the flash memory 7 where no data is stored, i.e., in a free area, data requested by the host computer 100 to be written in the flash memory 7. Needless to say, a writing method is not limited to this. For example, assume that data 2 is deleted from and data 4 is written in the data memory area where data 1, 2, and 3 are stored as illustrated in (a) of FIG. 5. In this case, the data 4 is dispersed with file chaining as illustrated in (b) of FIG. 5. This causes random access. That is, as is the case with a USB flash memory and a hard disk drive, it is possible to adopt a conventional file system as it is in the data memory area to be used as a data memory. In (a) and (b) of FIG. 5, each arrow indicates an ascending order of logical addresses.

(Details of System Starting Operation)

The following describes the system starting operation in more detail by showing a concrete example. The following deals with, as an example, a case where the host computer 100 requests, via the interface 13, that the hybrid BD drive 1 read out a single-byte data value "55" from an area specified by a physical address 1234 on the BD 8.

If the data line control section 10 detects a request, transmitted via the interface 13, that data be read out from the BD 8, the data line control section 10 notifies the data processing control section 11 that the data line control section 10 has received, via the interface 13, the request that data stored in an area specified by the physical address 1234 be read out from the BD 8. If the data processing control section 11 receives such a notice from the data line control section 10, the data processing control section 11 carries out a process for a case where the flash memory 7 is used as a cache memory. That is, the data processing control section 11 instructs the address control section 12 to determine whether or not the data stored in the area specified by the physical address 1234 on the BD 8 is stored in the flash memory 7.

The flash memory 7 stores cache data in such a manner that the cache data is correlated with a physical address on the BD 8. That is, if the data value stored in the area specified by the physical address 1234 is "55," the flash memory 7 stores corresponding data "123455." In other words, the data stored on the BD 8 is saved in the flash memory 7 so as to have, as a tag, the physical address "1234" on the BD 8 and so as to have the data value "55" as a data filed.

The address control section 12 searches for the cache data having, as a tag, the physical address 1234 received from the host computer 100. If the address control section 12 finds the cache data having the physical address "1234" as a tag, the address control section 12 extracts the data value "55" from the data field which is stored so as to be correlated with the physical address 1234. Then, the data line control section 10 outputs the data value "55" thus extracted to the host computer 100 via the interface 13 via which the physical address has been received.

If the cache data having the physical address "1234" as a tag is not found by the search, the data processing control section 11 instructs the disc control section 4 to read out data stored at the physical address 1234. The disc control section 4 thus instructed by the data processing control section 11 drives the optical pickup 5 in order to read the data value "55" from the area specified by the physical address 1234 on the BD 8. The disc control section 4 outputs the data value "55" thus read out to the host computer 100 via the interface 13.

In addition, the disc control section 4 also outputs the data value "55" thus read out to the data line control section 10. The data line control section 10 notifies the data processing control section 11 that the data line control section 10 has received a request that the data value "55" read out from the area specified by the physical address 1234 on the BD 8 be written in the flash memory 7 as cache data. The data processing control section 11 instructs the address control section 12 to save the physical address 1234 and the data value "55" in the flash memory 7 in such a manner that the physical address 1234 and the data value "55" are correlated with each other. As instructed by the data processing control section 11, the address control section 12 saves, in the flash memory 7, data "123455" in which the physical address 1234 and the data value "55" are correlated with each other. In this process, the data "123455" is saved in the flash memory 7 in ascending order of addresses of the flash memory 7.

The cache data stored in the flash memory 7 is initialized (erased) when the BD 8 is changed with another one. The following describes, in detail, initialization of cache data which is carried out in response to a change of BDs 8.

(Details of Data Processing Operation)

The following describes details of the data processing operation. The following deals with a case where the host computer 100 requests, via the interface 14, the hybrid BD drive 1 to read out a data value "445566778899" from an area specified by the logical address 00 000 000 of the flash memory 7.

If the data line control section 10 detects a request, transmitted via the interface 14, that data be read in the flash memory 7, the data line control section 10 notifies the data processing control section 10 that the data line control section 10 has received, via the interface 14, the request that data be read out from an area specified by the logical address 00 000 000 of the flash memory 7. If the data processing control section 11 receives such a notice from the data line control section 10, the data processing control section 11 carries out a process for a case where the flash memory 7 is used as a memory medium. That is, the data processing control section 11 converts the logical address 00 000 000 received from the host computer 100 into a corresponding physical address 10 000 000 of the flash memory 7. Then, the data processing control section 11 instructs the address control section 12 to read out data from the area specified by the physical address 10 000 000. A logical address is preferably converted into a physical address by a predetermined algorithm. For example, a logical address is converted into a physical address by use of an address conversion table which is stored in advance.

As instructed by the data processing control section 11, the address control section 12 reads out the data value "445566778899" from the area specified by the physical address 10 000 000. Then, the data line control section 10 outputs the data value "445566778899" thus read out to the host computer 100 via the interface 14.

The following describes a case where the host computer 100 requests, via the interface 14, that the data value "445566778899" be written in the flash memory 7.

If the data line control section 10 detects a request, transmitted via the interface 14, that the data be written in the flash memory 7, the data line control section 10 notifies the data processing control section 10 that the data line control section 10 has received, via the interface 14, the request that the data value "445566778899" be written in the flash memory 7. If the data processing control section 11 receives such a notice from the data line control section 10, the data processing control section 11 carries out a process for a case where the flash memory 7 is used as a memory medium. That is, the data processing control section 11 instructs the address control section 12 to write the data value "445566778899" in a free area of the flash memory 7.

As instructed by the data processing control section 11, the address control section 12 saves the data value "445566778899" at the physical address 10 000 000 in a case where, e.g., an area specified by the physical address 10 000

000 is a free area. The following describes an operation to be performed in a case where there is no free area in the flash memory 7.

(Writing of Write Cache)

The following describes how the hybrid BD drive 1 operates in a case where the hybrid BD drive 1 receives, from the host computer 100 via the interface 13, a request that the hybrid BD drive 1 rewrite data stored on the BD 8.

In a case where the BD 8 is a rewritable BD of, e.g., a phase change recording method, it is possible that the host computer 100 requests, via the interface 13, that data be written on the BD 8. The present embodiment deals with, as an example, a case where the host computer 100 requests the hybrid BD drive 1 to write a data value "66" at a physical address 1234 on the BD 8.

If the data line control section 10 detects a request, transmitted via the interface 13, that the hybrid BD drive 1 write the data onto the BD 8, the data line control section 10 notifies the data processing control section 10 that the data line control section 10 has received, via the interface 13, a request that the data "66" be written in an area specified by the physical address 1234 on the BD 8. If the data processing control section 11 receives the information from the data line control section 10, the data processing control section 11 carries out a process for a case where the flash memory 7 is used as a cache memory. That is, the data processing control section 11 instructs the address control section 12 to determine whether or not the flash memory 7 stores data identical with data stored in the area specified by the physical address 1234 on the BD 8.

As instructed by the data processing control section 11, the address control section 12 searches for, from among pieces of data stored in the flash memory 7, cache data which has "1234" as a tag. If the address control section 12 finds the cache data which has "1234" as a tag, the address control section 12 changes, by rewriting, a value in a data field of the cache data thus found to "66" (by overwriting the value with "66"). Hereinafter, such cache data in which a data value in a data field has been rewritten in the cache memory is referred to as a "write cache."

If the address control section 12 cannot find the cache data which has "1234" as a tag, the data processing control section 11 instructs the disc control section 4 to rewrite, to the data value "66", the data value stored in the area specified by the physical address 1234 on the BD 8. Accordingly, the disc control section 4 rewrites the data stored in the area specified by the physical address 1234 on the BD 8.

(Automatic Caching Function)

Figure 6:
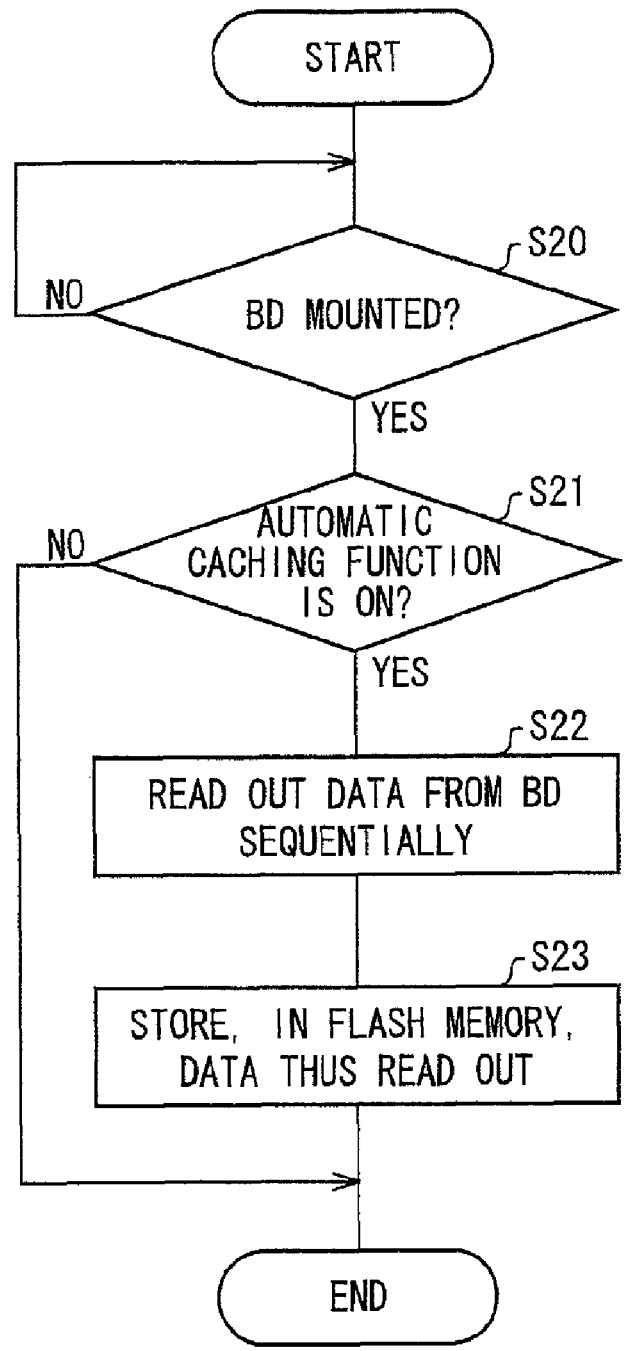
FIG. 6 is a flowchart showing an operation of automatically storing, in the flash memory as cache data, data stored on a BD.

The hybrid BD drive 1 can be arranged such that in a case where the BD 8 is loaded in the hybrid BD drive 1, the hybrid BD drive 1 automatically uploads data stored on the BD 8 to the flash memory 7 as cache data. The following describes how the hybrid BD drive 1 automatically stores the data from the BD 8 to the cache memory, with reference to FIG. 6. FIG. 6 is a flowchart showing how the hybrid BD drive 1 automatically uploads data stored on the BD 8 to the flash memory 7.

First, if the disc control section 4 detects loading of the BD 8 (step S20), the disc control section 4 determines whether or not a function of automatically saving, in the flash memory 7, the data of the BD 8 loaded in the hybrid BD drive 1 (hereinafter, referred to as an automatic caching function) is ON (step S21). If the automatic caching function is ON (Yes in the step S21), the disc control section 4 drives the optical pickup 5 so as to cause the optical pickup 5 to sequentially read the data stored on the BD 8 (step S22).

The data thus read out from the BD 8 is correlated with an address specifying an area on the BD 8 in which area the data is stored, and transmitted to the flash control section 2. The data line control section 10 in the flash control section 2 notifies the data processing control section 11 that the data line control section 10 has received a request that the data read out from the BD 8 be written in the flash memory 7 as cache data. The data processing control section 11 instructs the address control section 12 to store, in the flash memory 7, the data and the address so that the data and the address are correlated with each other. As instructed by the data processing control section 11, the address control section 12 stores, in the flash memory 7, the data and the address so that the data and the address are correlated with each other (step S23).

The step S23 is repeated until there is no data to be read out from the BD 8, i.e., until all data stored on the BD 8 is stored in the flash memory as cache data.

Disc control means 4 can detect, by a conventional publicly-known method, whether or not the BD 8 is loaded in the hybrid BD drive 1. For example, in a case where the hybrid BD drive 1 is a disc drive device of a slot-in type, the disc control section 4 determines, from the fact that the BD 8 is inserted into a slot, that the BD 8 has been loaded in the hybrid BD drive 1. In a case where the hybrid BD drive 1 is a disc drive of a disc-tray type, the disc control section 4 determines, from the fact that a disc tray is opened once and then closed, that the BD 8 has been loaded in the hybrid BD drive 1.

(Handling of Cache Data to be Carried Out when BD 8 is Loaded)

Figure 7:
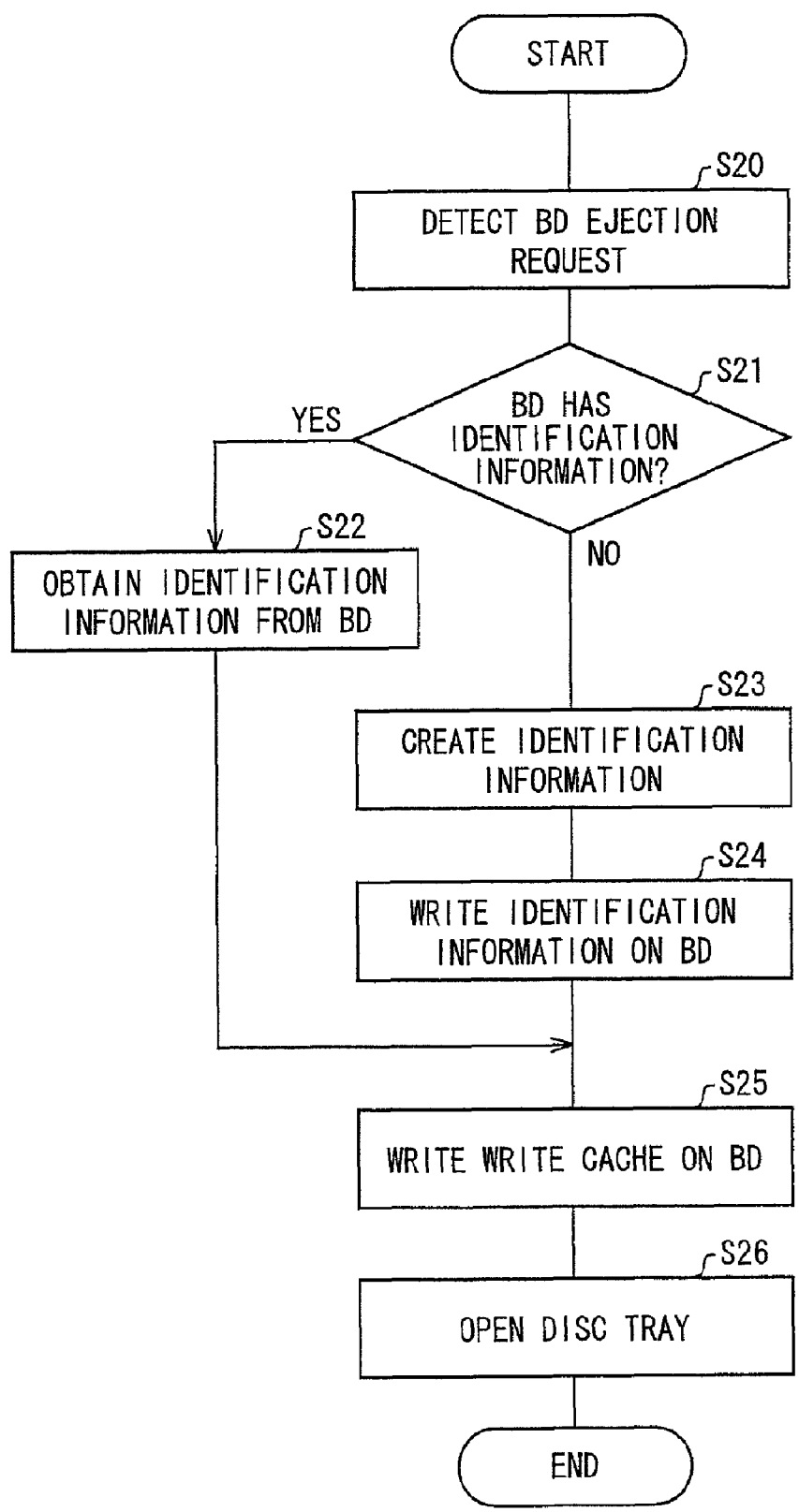
FIG. 7 is a flowchart showing how the hybrid BD drive operates in response to a request to take the BD out from the hybrid BD drive.

The following describes how cache data is handled when the BD 8 is taken out from the hybrid BD drive 1, with reference to FIG. 7. FIG. 7 is a flowchart showing how the hybrid BD drive 1 operates when the BD 8 is taken out from the hybrid BD drive 1.

If the hybrid BD drive 1 detects a request, from a user, that the BD 8 be taken out from the hybrid BD drive 1 (step S30), the hybrid BD drive 1 determines whether or not the BD 8 loaded in the hybrid BD drive 1 has identification information (step S31). If the BD 8 has the identification information (Yes in the step S31), the disc control section 4 drives the optical pickup 5 so as to cause the optical pickup 5 to obtain the identification information from the BD 8 (step S32). The identification information thus obtained is temporarily stored in the flash control section 2. If the BD 8 loaded in the hybrid BD drive 1 does not have identification information (No in the step S31), the flash control section 2 generates identification information of the BD 8 loaded in the hybrid BD drive 1 (step S33). The identification information thus generated is transmitted to the disc control section 4 while being temporarily stored in the flash control section 2. Then, the disc control section 4 drives the optical pickup 5 so as to cause the optical pickup 5 to write the identification information on the BD 8 (step S34).

After the identification information is obtained or the identification information is written on the BD 8, the data processing control section 11 reads out a write cache from among pieces of cache data stored in the flash memory 7, and instructs the disc control section 4 to write, on the BD 8, the write cache thus read out. As instructed by the data processing control section 11, the disc control section 4 drives the optical pickup 5 so as to cause the optical pickup 5 to store, on the BD 8, the data value of the write cache thus read out (step S35). After all write caches stored in the flash memory 7 are written back onto the BD 8, the hybrid BD drive opens a disc tray on which the BD 8 is loaded (step S36). In a case where the hybrid BD drive 1 is a drive of a slot-in type, the hybrid BD drive 1 ejects the BD 8.

Then, a process of ending an OS is carried out in a case where the BD 8 is a disc storing data of the OS.

The following shows a concrete example in order to describe how the write cache is written back onto the BD 8. Specifically, the following describes, as an example, a case where a data value originally stored at the physical address 1234 on the BD 8 is "55;" a tag of the write cache is "1234;" and a value in the data field is "66." The disc control section 4 is instructed by the data processing control section 11 to write data "123466" on the BD 8. As instructed by the data processing control section 11, the disc control section 4 stores the data value "66" in an area specified by the physical address 1234 on the BD 8 which physical address corresponds to the tag "1234." This also can be described as: the data value "55" is overwritten with the data value "66" since the data value "55" is originally stored at the physical address 1234 on the BD 8. As a result, the data value "66" thus updated in the cache data is written back onto the BD 8 when the BD 8 is taken out from the hybrid BD drive 1. That is, if the BD 8 is loaded in the hybrid BD drive 1 next time, the data value "66" stored in the area specified by the physical address 1234 is stored in the flash memory 7 as cache data.

Examples of identification information to be obtained from the BD 8 encompass a serial number specific to the BD 8. Similarly, identification information generated to be assigned to the BD 8 is preferably information unique to each optical disc. Examples of the identification information generated by the hybrid BD drive 1 encompass time to start generation of the identification information. For example, in a case where start time to generate identification information is 14:08 on Feb. 27, 2008, it follows that the identification information is "200802271408."

(Operation of Hybrid BD Drive 1 to be Performed in Reloading BD 8)

Figure 8:
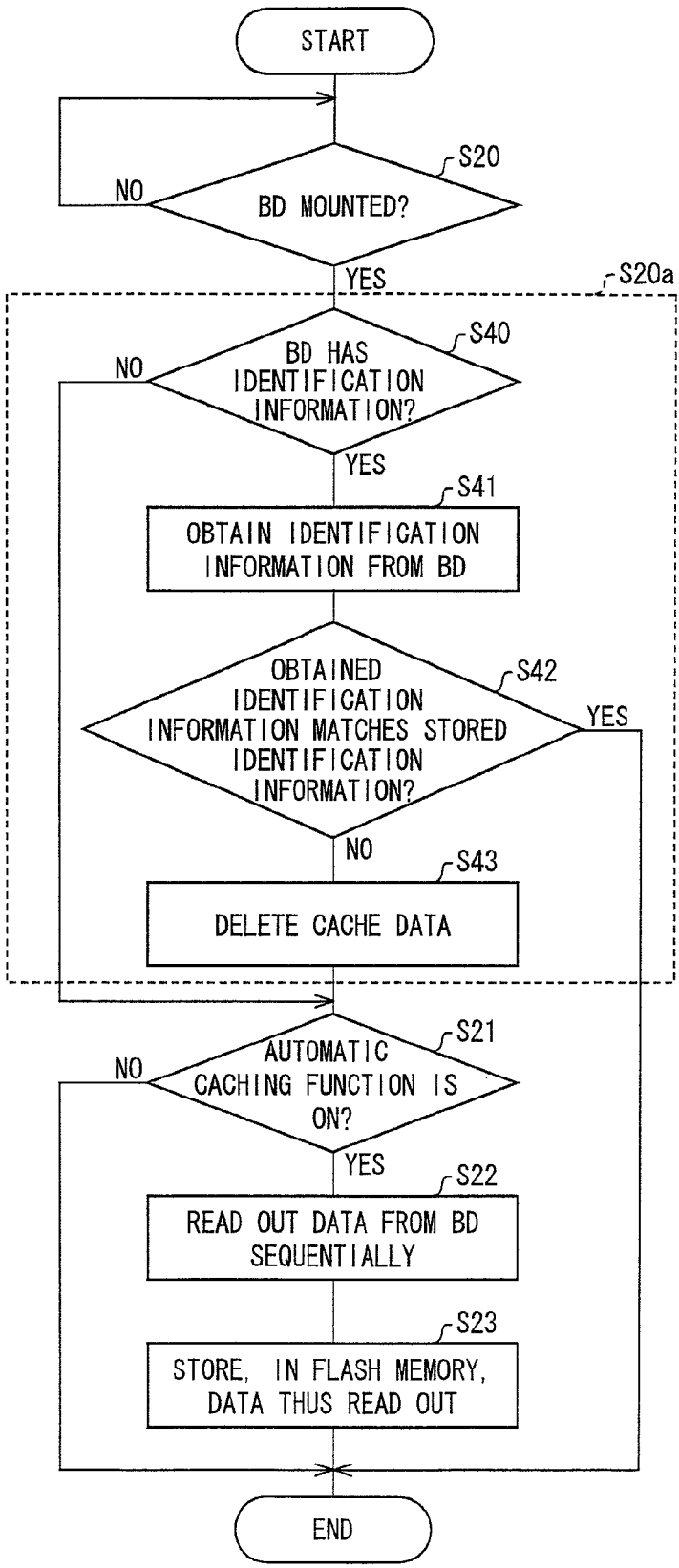
FIG. 8 is a flowchart showing how the hybrid BD drive operates in response to loading the BD in the hybrid BD drive.

With reference to FIG. 8, the following describes how the hybrid BD drive 1 operates in a case where the BD 8 is taken out from the hybrid BD drive 1 as is described above and then the BD 8 is returned in the hybrid BD drive 1 again. Operation of the hybrid BD drive 1 which is described below is similar to the operation of the automatic caching function described with reference to FIG. 6. Therefore, steps described in the explanation of the automatic caching function are given same reference signs, and detailed descriptions for the steps are omitted below. FIG. 8 is a flowchart showing how the hybrid BD drive 1 operates in a case where the BD 8 is loaded in the hybrid BD drive 1.

If the hybrid BD drive 1 recognizes that the BD 8 is loaded in the hybrid BD drive 1 (Yes in step S20), the hybrid BD drive 1 determines whether or not the BD 8 loaded in the hybrid BD drive 1 is identical with one previously loaded in the hybrid BD drive 1 (step S20a). The following describes the step S20a in detail which is not described in the explanation (see FIG. 6) of the automatic caching function.

First, the hybrid BD drive 1 determines whether or not the BD 8 loaded in the hybrid BD drive 1 has identification information (step S40). If the BD 8 has identification information (Yes in step S40), the disc control device 4 drives the optical pickup 5 so as to cause the optical pickup 5 to obtain the identification information from the BD 8 (step S41).

The identification information thus obtained is transmitted to the flash control section 2. The flash control section 2 determines whether or not the identification information obtained from the BD 8 matches identification information stored in the flash control section 2 (step S42). If the identification information stored in the flash control section 2 does not match the identification information obtained from the BD 8 (No in step S43), the hybrid BD drive 1 recognizes that the BD 8 is different from one previously loaded in the hybrid BD drive 1. Then, the flash control section 2 initializes cache data stored in the flash memory 7 (step S43). Then, the disc control section 4 determines whether or not the automatic caching function is ON (step S21). If the automatic caching function is ON (Yes in the step S21), the disc control section 4 drives the optical pickup 5 so as to cause the optical pickup 5 to sequentially read out data values stored on the BD 8 (step S22). Then, the flash control section 2 stores, in the flash memory 7 as cache data, the data values thus read out from the BD 8 (step S23).

If the identification information stored in the flash control section 2 matches the identification information obtained from the BD 8 (Yes in step S42), the hybrid BD drive 1 recognizes that the BD 8 is identical with the one previously loaded in the hybrid BD drive 1. That is, the flash control section 2 does not initialize the cache data stored in the flash memory 7 since the cache data can be used as it is.

Even if the flash control section 2 initializes the cache data stored in the flash memory 7, data stored in the flash memory 7 is not initialized except for the cache data but is retained as it is.

(Control of Cache Data Memory Area and Data Memory Area)

Figure 9:
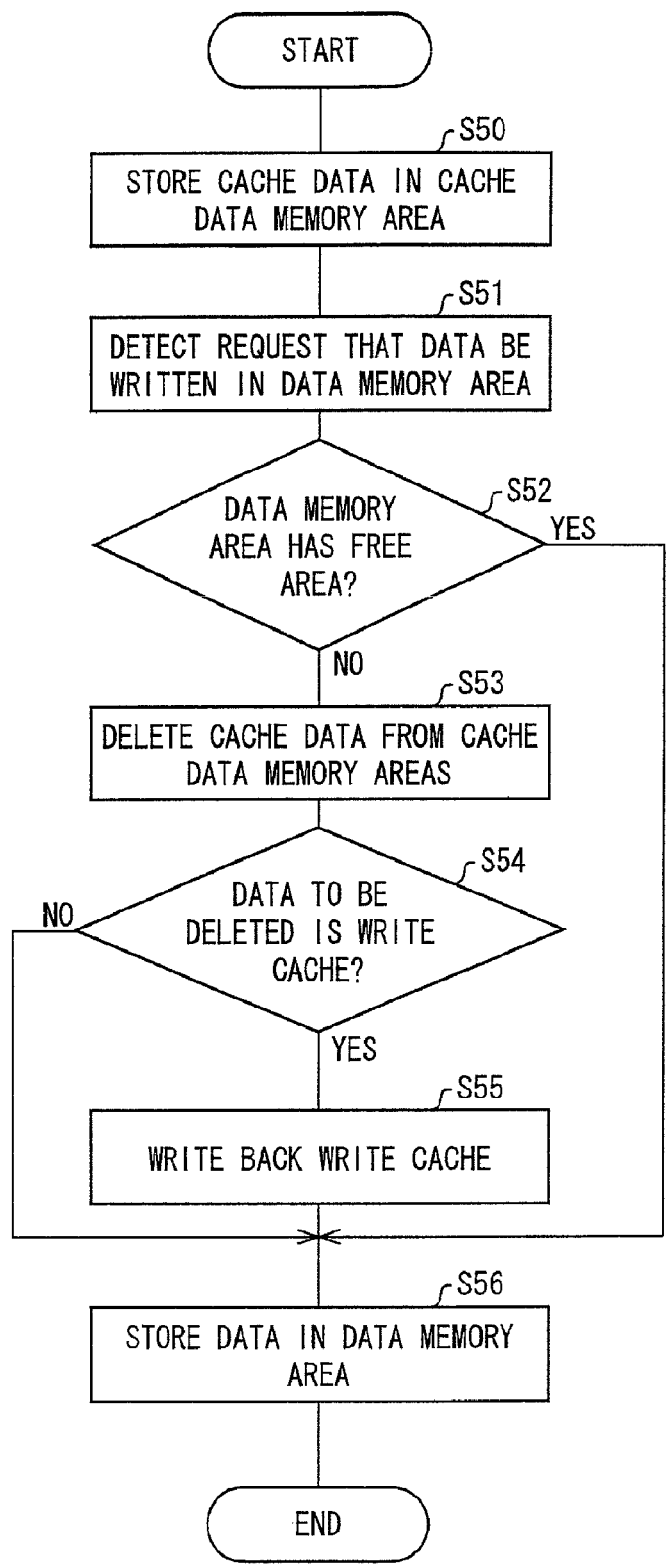
FIG. 9 is a flowchart showing how the cache data memory area and the data memory area are resized.
Figure 10:
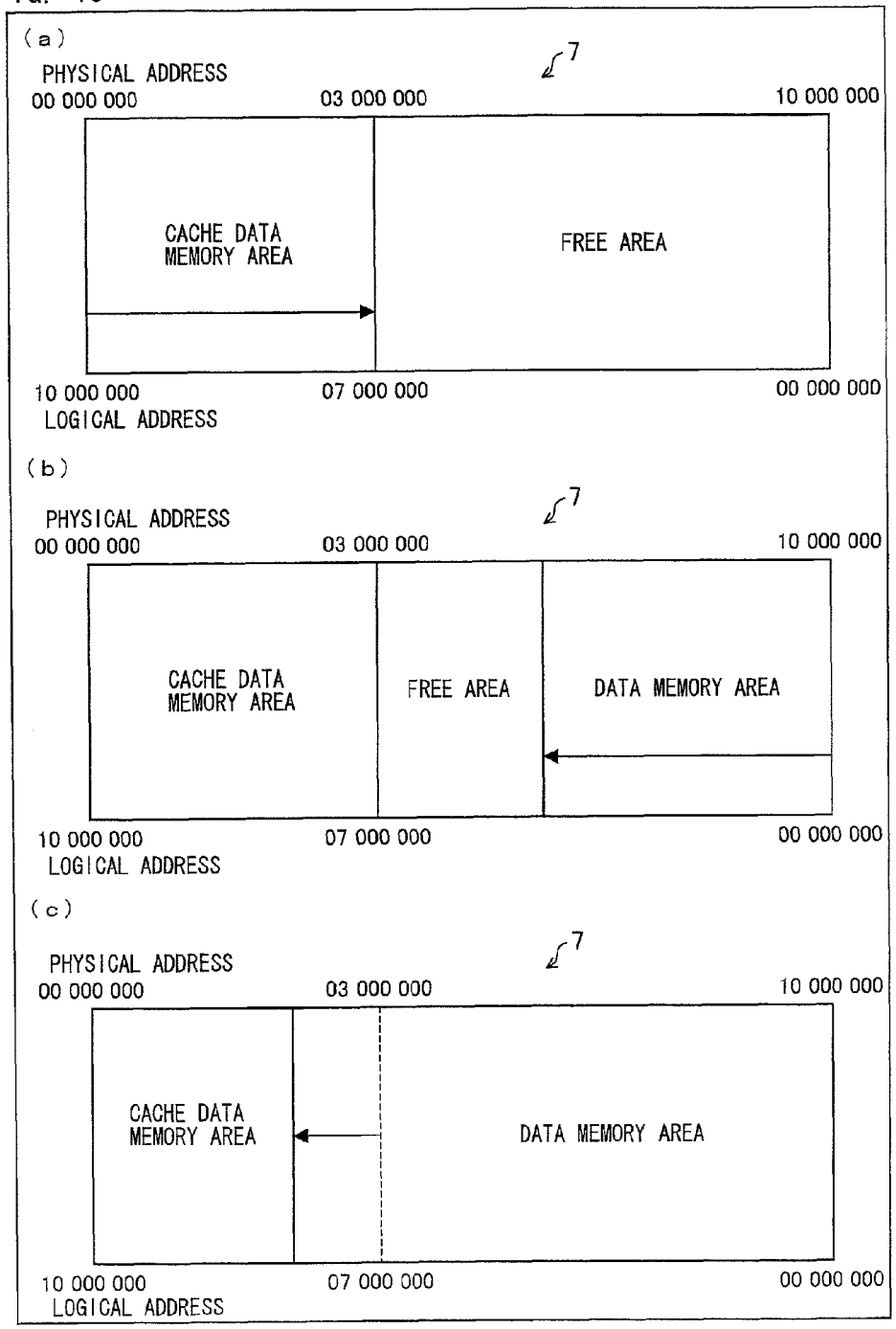
FIG. 10 is a schematic diagram illustrating how the memory areas of the flash memory are resized. (a) of FIG. 10 illustrates generation of the cache data memory area. (b) of FIG. 10 illustrates generation of the data memory area. (c) of FIG. 10 illustrates conversion of a part of the cache data memory area into a data memory area.

As described above, the cache data memory area and the data memory area of the flash memory 7 can be properly resized. The following describes how the cache data memory area and the data memory area are resized, with reference to FIG. 9 and (a) through (c) of FIG. 10. FIG. 9 is a flowchart showing how the cache data memory area and the data memory area are resized. (a) through (c) of FIG. 10 are schematic views illustrating changes of memory areas of the flash memory 7. (a) of FIG. 10 illustrates generation of the cache data memory area. (b) of FIG. 10 illustrates generation of the data memory area. (c) of FIG. 10 illustrates how a part of the cache data memory area is converted into a data memory area.

First, the hybrid BD drive 1 saves, in the cache data memory area of the flash memory 7 as cache data, data stored on the BD 8 (step S50). In this process, as illustrated in (a) of FIG. 10, the cache data is stored at physical addresses in ascending order of the physical addresses. Since detailed operation to be performed in the step S50 is described above with reference to FIG. 3, the following omits to repeat same explanation.

Then, the data line control section 10 detects a request, transmitted from the host computer 100, that the hybrid BD drive 1 write data in the data memory area of the flash memory 7 (step S51). In this process, the request is inputted via the interface 14. Accordingly, the data processing control section 11 carries out a process for a case where the flash memory 7 is used as a memory medium. In this process, the data processing control section 11 determines whether or not the flash memory 7 has an area where data encompassing cache data is not stored, i.e., determines whether or not there is a free area (step S52). In a case where the flash memory 7 has a free area (Yes in the step S52), the data processing control section 11 writes, in the flash memory 7, the data requested by the host computer 100 to be written in the flash memory 7 (step S56). In this process, as illustrated in (b) of FIG. 10, the data is stored in the free area of the flash memory 7. Since detailed operation to be performed in the step S56 is described above with reference to FIG. 4, the same explanation will not be repeated here.

If the flash memory 7 does not have a free area (No in the step S52), the data processing control section 11 deletes the cache data stored in the flash memory 7 (step S53). That is, in order to secure an area in which the data requested to be written in the flash memory 7 is written, the data processing control section 11 deletes the cache data. In this process, if the cache data to be deleted is write cache (Yes in the step S54), the data processing control section 11 writes back the write cache onto the BD 8 (step S55). Since detailed operation to be performed in the step S55 is described above with reference to FIG. 7, the same explanation will not be repeated here.

After a free area is secured by deleting the cache data, the data processing device 11 writes, in the free area, the data requested by the host computer 100 to be written in the flash memory 7 (step S56). Accordingly, as illustrated in (c) of FIG. 10, the cache data memory area is decreased while the data memory area is increased as much as the cache data memory area is decreased. Specifically, the cache data memory area is decreased from an area defined by a dashed line in (c) of FIG. 10 to an area defined by a continuous line in (c) of FIG. 10. On the other hand, the data memory area is increased from an area defined by the dashed line to an area defined by the continuous line. That is, an area between the dashed line and the continuous line is a data memory area to which a part of the cache data memory area is converted.

In a case where cache data to be deleted is not write cache (No in the step S54), the data processing device 11 does not carry out the step S55 but writes, in the data memory area, data requested by the host computer 100 to be written in the flash memory 7 (step S56).

The following shows a concrete example in order to describe, in more detail, how a part of the cache data memory area is converted into the data memory area. For example, assume the following. The flash memory 7 has no free area and the cache data memory area lies up to the physical address 03 000 000. Data "123566" is stored at the physical address 03 000 000. Assume that the host computer 100 requests that the hybrid BD drive 1 write a data value "998855" at the physical address 03 000 000 of the flash memory 7. Since the flash memory 7 has no free area, the data processing control section 11 deletes the data "123566" stored in an area specified by the physical address 03 000 000, which is an address indicating an end of the cache data memory area. Accordingly, the area where the data "123566" had been stored is secured as a free area. Then, the data processing control section 11 writes the data value "998855" in the free area thus secured.

Thus, in a case where the flash memory 7 has no free area, cache data is deleted so that a part of the cache data memory area is converted into a data memory area. However, for example, in a case where cache data stored in the cache memory is data of an OS, deleting all the cache data can hinder a system from starting up. Therefore, it is preferable to secure a minimal necessary cache data memory area.

For example, in a case where the flash memory has a memory capacity of 10 GB and 1 GB is secured at the minimum as a cache data memory area, the host computer 100 recognizes that the memory capacity of the flash memory 7 is 9 GB. That is, the host computer 100 cannot recognize, from the beginning, the 1 GB secured for a capacity of the cache memory.

According to the present embodiment, cache data is deleted first which is stored in an area specified by an address of an end of an area where the cache data is stored. However, the present embodiment is not limited to this. Cache data to be deleted can be determined in a random manner.

Alternatively, cache data to be deleted can be determined in accordance with a predetermined algorithm. The deletion of cache data can be to spare the capacity of the cache data memory area as much as just necessary for writing, in the flash memory 7, data requested to be written in the flash memory 7. Alternatively, the deletion of cache data can be to spare a predetermined amount of the capacity of the cache data memory area stepwise so that a capacity required for writing data requested to be written in the flash memory 7 is secured.

(Advantage of Hybrid BD Drive 1)

As described above, the hybrid BD drive 1 includes the flash memory 7 which can be used as (i) a cache memory which stores cache data in accordance with a detected address and as (ii) a data memory which stores data except the cache data. In a case where the flash memory 7 is used as a cache memory, the hybrid BD drive 1 reads out, from the flash memory 7, data identical with data stored on the BD 8. This makes it possible to reduce an access time required for reading out desired data. The flash memory 7 can also be used as a data memory. This makes it possible to effectively utilize a memory area where the no cache data is stored.

Therefore, the hybrid BD drive 1 makes it possible to reduce an access time in random access, and effectively utilize an unused memory area of the flash memory 7.

In the flash memory 7 provided in the hybrid BD drive 1, a memory area to be used as a cache memory is properly resized in accordance with a size of a memory area to be used as a data memory.

This makes it possible to divide the memory area of the flash memory 7 into an area to be used as a cache memory and an area to be used as a data memory, in accordance with how a user uses the flash memory 7, without wasting the memory area.

In addition, when the BD 8 is loaded in the hybrid BD drive 1, the hybrid BD drive 1 can automatically save, in the flash memory 7 as cache data, data stored on the optical BD 8 thus loaded in the hybrid BD drive 1. This makes it possible to store, in the flash memory 7 as cache data, the data stored on the BD 8, without requiring a troublesome user operation.

In the hybrid BD drive 1, cache data stored in the flash memory 7 is overwritten with data to be stored on the BD 8. This makes it possible to keep the cache data stored in the flash memory 7 updated. The cache data thus overwritten is written back onto the BD 8 when the BD 8 is taken out from the hybrid BD drive 1. This makes it possible to reflect a data update to the BD 8. This allows the BD 8 to store updated data to which the data update has been reflected, even if cache data is deleted from the flash memory 7.

Further, the hybrid BD drive 1 can determine whether or not a currently-loaded BD is identical with a previously-loaded BD, on the basis of identification information obtained from the BDs. According to the arrangement, in a case where two identical BDs are sequentially loaded in the hybrid BD drive 1, the hybrid BD drive 1 can omit an operation of storing, in the flash memory 7 as cache data, data stored on a secondarily-stored one of the two identical BDs. Therefore, for example, in a case where data stored on a BD is data of an OS, it possible to reduce a time required for a start-up of the OS.

Further, the hybrid BD drive 1 can assign, to the BD 8, identification information generated in the hybrid BD drive 1. This makes it possible to assign the identification information to even a BD 8 which originally has no identification information. That is, the hybrid BD drive 1 can determine whether or not a currently-loaded BD is identical with a previously-loaded BD, even in a case where the BDs originally have no identification information.

(Recognition of Data Line)

Figure 11:
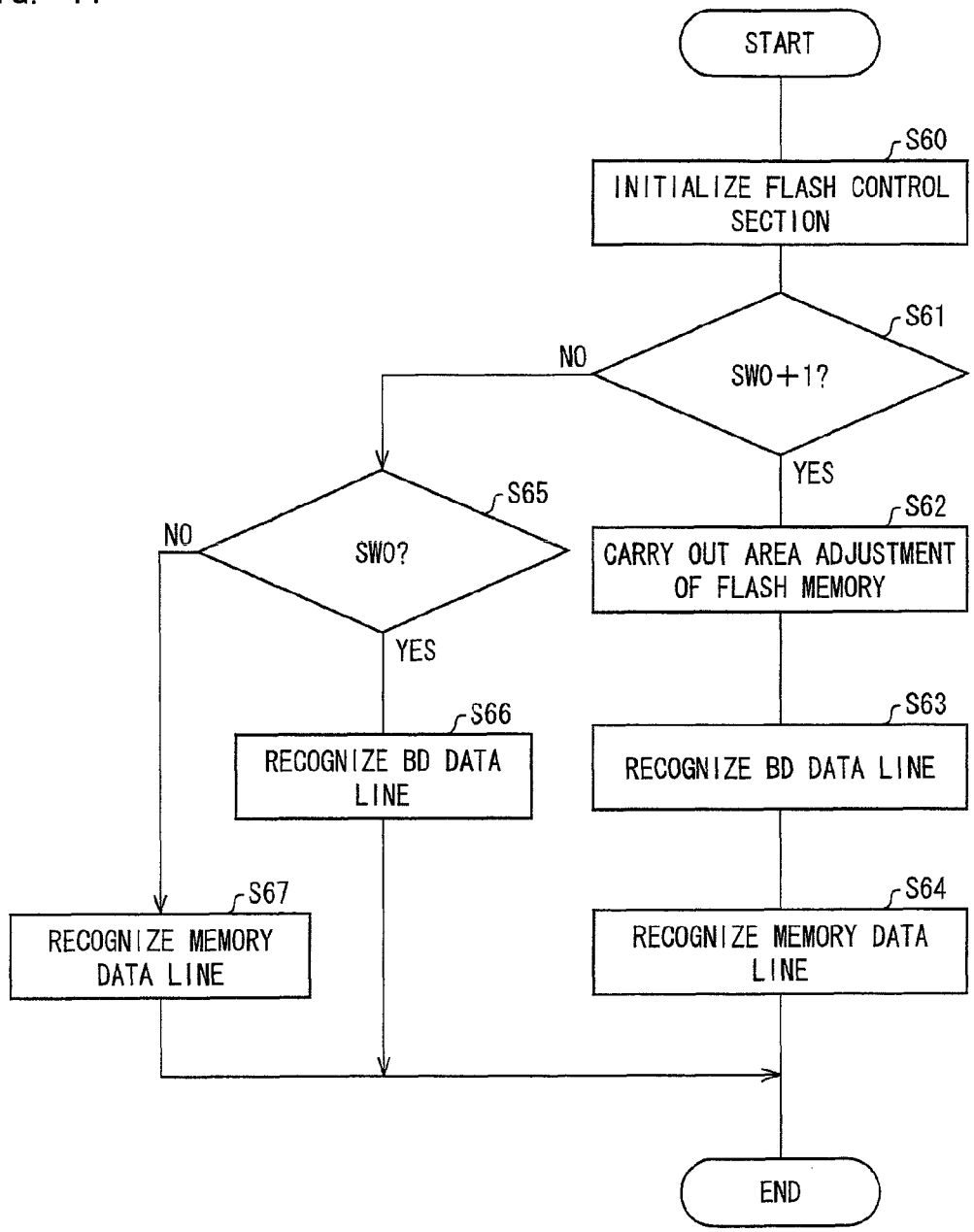
FIG. 11 is a flowchart showing how the hybrid BD drive 1 recognizes

With reference to FIG. 11, the following describes an operation of recognizing the data line extending from the interface 13 and the data line extending from the interface 14. FIG. 11 is a flowchart showing how the hybrid BD drive 1 recognizes the data lines.

Herein, a switch which is controlled by the switch control section 6 so as to cause the flash memory 7 to operate only as a cache memory is referred to as "SW0;" a switch which is controlled by the switch control section 6 so as to cause the flash memory 7 to operate only as a data memory is referred to as "SW1;" and a switch which is controlled by the switch control section 6 so as to cause the flash memory 7 to operate as both a cache memory and a data memory is referred to as "SW0+1." In other words, "SW0" is a switch which transmits, to the data line control section 10, an instruction that the data line control section 10 recognizes only the data line via the interface 13 (hereinafter, referred to as a BD data line); "SW1" is a switch which transmits, to the data line control section 10, an instruction that the data line control section 10 recognizes only the data line via the interface 14 (hereinafter, referred to as a memory data line); and "SW0+1" is a switch which transmits, to the data line control section 10, an instruction that the data line control section 10 recognizes both the BD data line and the memory data line.

When a power supply of the host computer 100 is switched from an OFF state to an ON state, a power supply of the hybrid BD drive 1 is also switched to an ON state accordingly. When the power supply of the hybrid BD drive 1 is switched to the ON state, the flash control section 2 initializes itself (step S60). On the other hand, the disc control section 4 also initializes itself.

After the flash control section 2 is initialized, the data line control section 10 determines whether or not a switch currently controlled by the switch control section 6 is "SW0+1" (step S61). If the switch currently controlled by the switch control section 6 is "SW0+1" (Yes in the step S61), the flash control section 2 carries out area readjustment of the flash memory 7 (step S62). Then, the data line control section 10 recognizes the BD data line (step S63), and then, recognizes the memory data line (step S64). In this case, the data line control section 10 can detect both data received via the interface 13 and data received via the interface 14. Therefore, the flash memory 7 can be used as both a cache memory and a data memory.

In a case where the switch currently controlled by the switch control section 6 is not "SW0+1" (No in the step S61), the data line control section 10 determines whether or not the switch currently controlled by the switch control section 6 is "SW0" (step S65). In a case where the switch currently controlled by the switch control section 6 is "SW0" (Yes in the step S65), the data line control section 10 recognizes the BD data line only. In this case, the data line control section 10 can detect only data received via the interface 13. Therefore, the flash memory 7 can be used only as a cache memory.

In a case where the switch currently controlled by the switch control section 6 is not "SW0" (No in the step S65), it follows that the switch is SW1. Therefore, the data line control section 10 recognizes the memory data line only (step S67). In this case, the data line control section 10 can detect only data received via the interface 14. Therefore, the flash memory 7 can be used only as a data memory.

According to the flowchart of FIG. 11, the data line control section 10 establishes the BD data line first, and then, establishes the memory data line. However, the present embodiment is not limited to this but can be arranged such that the data line control section 10 establishes the memory data line first, and then, establishes the BD data line.

In a case where a switch currently controlled by the switch control section 6 is switched to another switch while the host computer 100 operates, the step S61 and following steps are carried out so that a data line currently recognized by the data line control section 10 may be changed to another data line.

(Program and Storage Medium)

Finally, the blocks of the flash control section 2 of the hybrid BD drive 1 may be realized by way of hardware, or may be realized by way of software as executed by a CPU (Central Processing Unit) such as an MPU as follows:

The flash control section 2 includes a CPU such as an MPU and memory devices (memory media). The CPU executes instructions in programs realizing the functions. The memory devices include a ROM (Read Only Memory) which contains the programs, a RAM (Random Access Memory) to which the programs are loaded so as to have an executable form, and a memory containing the programs and various data.

The object of the present invention can be achieved not only in a case where the programs are stored in a program memory of the flash control section 2 in a fixed manner but also in a case where a storage medium containing program code (executable program, intermediate code program, or source program) of the programs is mounted to the hybrid BD drive 1 so that the hybrid BD drive 1 may retrieve and execute the program code contained in the storage medium.

The storage medium is not limited to one having a specific structure or one of a specific type. The storage medium may be, for example, a tape, such as a magnetic tape or a cassette tape; a magnetic disk, such as a Floppy® disk or a hard disk, or an optical disk, such as CD-ROM/MO/MD/DVD/CD-R; a card, such as an IC card (including a memory card) or an optical card; or a semiconductor memory, such as a mask ROM/EPROM/EEPROM/flash ROM.

The object of the present invention can also be achieved by arranging the flash control section 2 (or the hybrid BD drive 1) such that the flash control section 2 is connectable with a communications network. In this case, the program code is supplied to the flash control section 2 via the communications network. The communications network is not limited to one of a specific type or a specific form but can be any communications network, provided that the program code can be supplied to the flash control section 2. The communications network can be, for example, the Internet, an intranet, extranet, LAN, ISDN, VAN, CATV communications network, virtual dedicated network (Virtual Private Network), telephone line network, mobile communications network, or satellite communications network.

The transfer medium which makes up the communications network is not limited to one of a specific arrangement or a specific type but can be any transfer medium, provided that the program code can be transmitted. For example, the transfer medium can be a wired line, such as IEEE 1394, USB, electric power line, cable TV line, telephone line, or ADSL (Asymmetric Digital Subscriber Line) line; or wireless, such as infrared radiation (IrDA, remote control), Bluetooth®, 802.11 wireless, HDR, mobile telephone network, satellite line, or terrestrial digital network. The present invention can also be realized by the program code in the form of a computer data signal embedded in a carrier wave which is embodied by electronic transmission.

(Additional Remarks)

In a case where the flash memory 7 has a function of a data memory, i.e., a switch controlled by the switch control section 6 is "SW1" or "SW0+1," data stored on the BD 8 can be copied to the data memory area of the flash memory 7. For example, in a case where the BD 8 stores data of an OS, the data is copied to the data memory area. When used, the data is read out from the data memory area. Accordingly, the BD 8 storing the data of the OS can be taken out from the hybrid BD drive 1. This makes it possible to use the hybrid BD drive 1 as an ordinary BD drive.

In order to copy data stored on the BD 8 to a storage medium such as a hard disk provided in the host computer 100, it is necessary to carry out data exchange via an external bus. For such data exchange to be carried out via an external bus, encryption and decryption of data to be exchanged are required from viewpoints such as prevention of illegal copying. The encryption and decryption cause a very high CPU load of the host computer 100, and hinder high-speed copying.

In contrast, copying data stored on the BD 8 to the data memory area of the flash memory 7 is a process to be carried out inside the hybrid BD drive (device). Therefore, the process is highly secure and does not require the encryption and decryption of data to be copied. That is, this allows high-speed data copying, without increasing a load on external devices such as the host computer 100. Further, this makes it possible to omit a process of complying with a standard such as a standard for content protection. As a result, the number of steps of device development can be reduced.

Although the present invention is concretely described above by showing the embodiment, the present invention is not limited to the description of the embodiments above, but may be altered by a skilled person within the scope of the claims. An embodiment based on a proper combination of technical means disclosed in different embodiments is encompassed in the technical scope of the present invention.

As described above, an optical disc drive device of the present invention can use a nonvolatile memory as a so-called cache memory for storing cache data and also as a data memory for storing data except the cache data.

This allows the optical disc drive device of the present invention to reduce an access time in random access, and to effectively utilize an unused memory area of the nonvolatile memory in which unused memory area no cache data is stored.

The embodiment and concrete examples of implementation discussed in the foregoing detailed explanation serve solely to illustrate the technical details of the present invention, which should not be narrowly interpreted within the limits of such embodiment and concrete examples, but rather may be applied in many variations within the spirit of the present invention, provided such variations do not exceed the scope of the patent claims set forth below.

Industrial Applicability

The optical disc drive device of the present invention is widely applicable to disc drive devices to be used in combination with an optical disc. More specifically, the disc drive devices encompass CD drives, DVD drives, and BD drives.

The invention claimed is:

1. An optical disc drive device including a nonvolatile memory, comprising:
    cache control means, wherein if a first address specifying a sector of an optical disc, the first address to be received via a first interface, is received via the first interface, the cache control means reads out, from the nonvolatile memory, cache data having been read out from the sector and stored in the nonvolatile memory in correlation with the first address, and if the cache data cannot be thus read out from the nonvolatile memory, the cache control means receives data stored in the sector on the optical disc and writes the data in the nonvolatile memory in correlation with the first address; and
    data control means for (a) reading out data from the nonvolatile memory in accordance with a second address specifying an area of the nonvolatile memory, the second address received via a second interface, or (b) writing, in the nonvolatile memory, data received via the second interface,
    said nonvolatile memory having a first area and a second area, the first area allowing data access using the first address, the second area allowing data access using the second address, and
    the first address belonging to an address space different from an address space to which the second address belongs.

2. The optical disc drive device as set forth in claim 1, wherein the data control means deletes the cache data so as to secure an area in which the data received via the second interface is to be written.

3. An optical disc drive device including a nonvolatile memory, comprising:
    cache control means, wherein if a first address specifying a sector of an optical disc is received via a first interface, the cache control means reads out, from the nonvolatile memory, cache data having been read out from the sector and stored in the nonvolatile memory in correlation with the first address, and if the cache data cannot be thus read out from the nonvolatile memory, the cache control means receives data stored in the sector on the optical disc and writes the data in the nonvolatile memory in correlation with the first address,
    data control means for (a) reading out data from the nonvolatile memory in accordance with a second address received via a second interface, or (b) writing, in the nonvolatile memory, data received via the second interface; and
    disc detecting means for detecting loading of an optical disc,
    when the disc detecting means detects loading of an optical disc, the cache control means (i) receiving data stored in a sector on the optical disc, the sector being specified by an address, and (ii) writing the data in the nonvolatile memory in such a manner that the data is correlated with the address.

4. The optical disc drive device as set forth in claim 1, wherein the cache control means overwrites, with data received together with the first address via the first interface, the cache data correlated with the first address.

5. An optical disc drive device including a nonvolatile memory, comprising:
    cache control means, wherein if a first address specifying a sector of an optical disc is received via a first interface, the cache control means reads out, from the nonvolatile memory, cache data having been read out form the sector and stored in the nonvolatile memory in correlation with the first address, and if the cache data cannot be thus read out from the nonvolatile memory, the cache control means receives data stored in the sector on the optical disc and writes the data in the nonvolatile memory in correlation with the first address; and
    data control means for (a) reading out data from the nonvolatile memory in accordance with a second address received via a second interface, or (b) writing, in the nonvolatile memory, data received via the second interface,
    the cache control means overwriting, with data received together with the first address via the first interface, the cache data correlated with the first address,
    the cache control means writing back, into the sector specified by the first address, the cache data thus overwritten.

6. An optical disc drive device including a nonvolatile memory, comprising:

cache control means, wherein if a first address specifying a sector of an optical disc is received via first interface, the cache control means reads out, from the nonvolatile memory, cache data having been read out from the sector and stored in the nonvolatile memory in correlation with the first address, and if the cache data cannot be thus read out from the nonvolatile memory, the cache control means receives data stored in the sector on the optical disc and writes the data in the nonvolatile memory in correlation with the first address, data control means for (a) reading out data from the nonvolatile memory in accordance with a second address received via a second interface, or (b) writing, in the nonvolatile memory, data received via the second interface; and identification information obtaining means for obtaining identification information, the identification information stored on an optical disc in order that the optical disc may be distinguished from another optical disc, the cache control means initializing the cache data in a case where identification information obtained by the identification information obtaining means does not match identification information of an optical disc storing data identical with data stored, as cache data, in the nonvolatile memory.

7. The optical disc drive device as set forth in claim 6, further comprising:

identification information generating means for generating identification information for identifying an optical disc to be distinguishable from another optical disc; and data writing means for writing, onto the optical disc, the identification information generated by the identification information generating means.

8. A non-transitory computer-readable storage medium storing a program which, when executed by a computer, causes an optical disc drive device including a nonvolatile memory to operate, the optical disc drive device comprising cache control means, wherein if a first address specifying a sector of an optical disc, the first address to be received via a first interface, is received via the first interface, the cache control means reads out, from the nonvolatile memory, cache data having been read out from the sector and stored in the nonvolatile memory in correlation with the first address, and if the cache data cannot be thus read out from the nonvolatile memory, the cache control means receives data stored in the sector on the optical disc and writes the data in the nonvolatile memory in correlation with the first address; and data control means for (a) reading out data from the nonvolatile memory in accordance with a second address specifying an area of the nonvolatile memory, the second address received via a second interface, or (b) writing, in the nonvolatile memory, data received via the second interface, said nonvolatile memory having a first area and a second area, the first area allowing data access using the first address, the second area allowing data access using the second address, and the first address belonging to an address space different from an address space to which the second address belongs, and the program causing a computer to operate as the respective means.

* * * * *